(12) United States Patent
Salinas et al.

(10) Patent No.: US 11,031,819 B2
(45) Date of Patent: Jun. 8, 2021

(54) SYSTEM FOR WIRELESS POWER TRANSFER BETWEEN LOW AND HIGH ELECTRICAL POTENTIAL, AND A HIGH VOLTAGE CIRCUIT BREAKER

(71) Applicant: ABB Power Grids Switzerland AG, Baden (CH)

(72) Inventors: Ener Salinas, Västerås (SE); Dierk Bormann, Västerås (SE)

(73) Assignee: ABB Power Grids Switzerland AG, Baden (CH)

(*) Notice: Subject to any disclaimer, the term of this patent is extended or adjusted under 35 U.S.C. 154(b) by 0 days.

(21) Appl. No.: 16/499,678

(22) PCT Filed: Mar. 27, 2018

(86) PCT No.: PCT/EP2018/057737
§ 371 (c)(1),
(2) Date: Sep. 30, 2019

(87) PCT Pub. No.: WO2018/184909
PCT Pub. Date: Oct. 11, 2018

(65) Prior Publication Data
US 2020/0119588 A1    Apr. 16, 2020

(30) Foreign Application Priority Data
Apr. 7, 2017 (EP) .................................. 17165430.4

(51) Int. Cl.
*H02J 50/12* (2016.01)
*H01F 27/28* (2006.01)
(Continued)

(52) U.S. Cl.
CPC .............. *H02J 50/12* (2016.02); *H01F 27/28* (2013.01); *H01F 38/14* (2013.01); *H04B 5/0037* (2013.01)

(58) Field of Classification Search
None
See application file for complete search history.

(56) References Cited

U.S. PATENT DOCUMENTS 8,729,738 B2   5/2014  Camurati et al.
9,172,276 B2   10/2015 Ichikawa et al.
(Continued)

FOREIGN PATENT DOCUMENTS

CN   104901437 A   9/2015
CN   105449874 A   3/2016
(Continued)

OTHER PUBLICATIONS

International Preliminary Report on Patentability Application No. PCT/EP2018/057737 Completed: May 23, 2019; dated May 23, 2019 12 pages.
(Continued)

*Primary Examiner* — Jared Fureman
*Assistant Examiner* — Aqeel H Bukhari
(74) *Attorney, Agent, or Firm* — Sage Patent Group (57) ABSTRACT

A system for wireless power transfer having a power transfer device, including a capacitor unit and an inductor unit connected in series to form an LC resonant circuit. The inductor unit is designed to form an envelope with a toroidal shape, the envelope forming an inductor coil with at least one turn, which generates an oscillating magnetic field outside of the envelope used for the wireless power transfer. The ends of each turn are electrically insulated from each other by means of an insulation gap, and appropriately connected by wires inside the envelope. The capacitor unit is disposed inside this envelope such that the envelope wraps the capacitor unit and wires between the capacitor unit and the inductor unit.

20 Claims, 6 Drawing Sheets

(51) Int. Cl.
*H01F 38/14* (2006.01)
*H04B 5/00* (2006.01)

(56) References Cited

U.S. PATENT DOCUMENTS

| | | | |
|---|---|---|---|
| 2002/0057164 A1* | 5/2002 | Jin | H01F 38/14 |
| | | | 336/115 |
| 2016/0197492 A1 | 7/2016 | Fujita et al. | |
| 2016/0284459 A1* | 9/2016 | Ishigaki | H01F 38/14 |
| 2019/0019611 A1* | 1/2019 | Maeda | H01F 27/28 |
| 2019/0221364 A1* | 7/2019 | Rangel | H01F 41/04 |

FOREIGN PATENT DOCUMENTS

| | | |
|---|---|---|
| CN | 205355968 U | 6/2016 |
| CN | 106849376 A | 6/2017 |
| DE | 102014212842 A1 | 1/2016 |
| EP | 2701280 A1 | 2/2014 |
| WO | 2014121100 A1 | 8/2014 |
| WO | 2017007163 A1 | 1/2017 |

OTHER PUBLICATIONS

International Search Report and Written Opinion of the International Searching Authority Application No. PCT/EP2018/057737 Completed: Jun. 11, 2018;dated Jun. 19, 2018 13 pages.
Chinese Search Report for Chinese Application No. 2018800229784 dated Mar. 29, 2020,, 4 pages.
Chinese First Office Action for Chinese Application No. 2018800229784 dated Apr. 7, 2020, 5 pages.

* cited by examiner

SYSTEM FOR WIRELESS POWER TRANSFER BETWEEN LOW AND HIGH ELECTRICAL POTENTIAL, AND A HIGH VOLTAGE CIRCUIT BREAKER

TECHNICAL FIELD

The present invention relates to a system for wireless power transfer having at least one power transfer device comprising a capacitor unit and an inductor unit connected in series to form a LC resonant circuit. In particular, the invention relates to a system suitable for wireless power transfer in a high voltage environment. The present invention also relates to a high voltage circuit breaker using such a system.

BACKGROUND

In high voltage systems it is not infrequent to require auxiliary power in regions at very high electrical potential (up to several hundreds of kV) relative to ground, usually located at a certain height above the ground. This is required for operating a variety of devices, some of which are related to essential functions, such as powering circuit breakers, charging batteries, or maintaining communication for condition monitoring. For example, a standard way to actuate a high voltage circuit breaker is with a motor-charged spring mechanism (located at ground potential) that operates in combination with an insulating rod. Usually the motor is bulky, the mechanisms cumbersome and the rod only transmits a single mechanical impulse at the time. It would be very convenient to wirelessly transfer electric power to the part of the system at high-potential to readily operate the circuit breakers, for example by electrical motors or actuators located at the high potential, as well as other devices. Thus, it is a desire to be able to wirelessly power equipment, such as breakers, sensors, and energy storage etc., located at high electrical potential.

With a high potential is meant here a voltage above 1 kV relative to ground. The high potential region is usually located at a certain distance, up to several meters, from the ground potential in order to avoid flashover. The higher the voltage, the larger distance from ground is needed, e.g., in air 150 kV requires a 1.2 m gap. Thus, a problem is how to transfer the power over such a large distance from ground in order to reach the devices to be powered.

One known way of doing such energy transfer in principle is by magnetic induction, using magnetically coupled LC resonators. However, in a high voltage environment, sharp edges and details of metallic components could generate severe issues, such as partial caused by discharges and in the worst case arcing, due to excessive electric field gradients around the sharp edges. To bring energy up to the high potential region, this problem has to be solved.

CN205355968 discloses a system for wireless power transmission in a high voltage environment using a LC resonant loop. The power transmission system comprises a transmitting coil, a receiving coil, and a repeating coil. The transmitting coil and receiving coil are set up at high potential and earth potential, respectively. The repeating coil is set up between the transmitting coil and the receiving coil. The repeating coil has a curved shape, following the equipotential surface, to form a smooth electrical field distribution between the transmitting coil and the receiving coil. The document does not mention the use of capacitors in the system. A problem with using capacitors in a high voltage environment is that their conducting inner structure and connection leads may have sharp edges which lead to the excessive electric field gradients mentioned above, unless proper shielding measures are applied. Such shielding measures thus are a necessary part of any acceptable design solution.

US2016/284459 A1 discloses a magnetic air core apparatus with a first toroid formed of a plate like structure wrapped in a helical shape and including an air core. The apparatus further has a second toroid that envelopes the first toroid in a concentric manner. The document describes an embodiment where this apparatus is used to transfer power. The toroid then is encircled by windings in two places, one which transfers power to the toroid and one that receives it. Due to the windings, the apparatus cannot be used to transfer power between different potentials in a high voltage environment. Furthermore, since the windings are encircling the toroid, the power transfer cannot be considered to be wireless, in the sense that transmitter and receiver are physically separated entities, any more than a conventional transformer.

SUMMARY

It is an object of the present invention to at least partly overcome the above problems, and to provide a system suitable for wireless power transfer in a high voltage environment.

This object is achieved by a system for wireless power transfer as defined in the present invention.

The system comprises a power transfer device comprising a capacitor unit and an inductor unit connected in series to form an LC resonant circuit adapted for wireless power transfer. According to the invention, the inductor unit is designed to form an envelope with a toroidal shape, the envelope forming an inductor coil with at least one turn and the ends of each turn are electrically insulated from each other by means of an insulation gap. The capacitor unit is disposed inside this envelope such that the envelope wraps the capacitor unit and the wires between the capacitor unit and the inductor unit.

The envelope forming a coil with at least one turn generates an oscillating magnetic field used for the wireless power transfer. The invention solves the problem of excessive electric field gradients due to sharp edges by designing the inductor unit as a smooth toroid, and more particular as a torus, and to house the capacitor unit inside the toroid. Thus, an LC resonator with a toroidal outer shape is achieved. The toroid has a smooth surface and no sharp edges, so that excessive electric field gradients are minimized. The toroidal shape of the LC resonator will guarantee smooth electric field distribution around the LC resonator implying minimal electrical stresses. The capacitor unit is enclosed by the envelope with the toroidal shape. Thus, the envelope with the toroidal shape forms a shield around the capacitor unit and thereby prevents excessive electric field gradients at the capacitors and thereby prevents the capacitor from being damaged.

The idea of this invention is to apply a toroidal geometry to the power transfer device to smooth electric forces and stresses in a high voltage environment. The high voltage environment can be AC or DC. The system according to the invention enables reliable power transfer between equipment located at different potentials. The potential difference can be considerable, i.e. from 1 kV up to several 100 kV.

The toroidal shape of the inductor also ensures that the current in the inductor becomes well distributed to avoid hot spots in the inductor, which otherwise would cause excessive losses and may cause damages to the inductor.

The envelope wraps the capacitor unit and the wiring between the capacitor unit and the inductor unit, thereby providing inductance to the system and at the same time shielding its inside from the magnetic field of high strength. Furthermore, it minimizes stresses due to the external high electric field.

The inductor unit and the capacitor unit are connected in series. Since the inductor unit has a toroidal shape, the magnetic field resulting from a current running through the LC resonant circuit will go through the middle hole of the toroid and around the outside of the toroid.

According to an embodiment of the invention, the insulation gap extends radially from an inner periphery to an outer periphery of the envelope so that at least one inductor turn is formed, extending from one side of the insolation gap to the other side of the insulation gap. The insulation gap is a groove or slot extending around the toroidal shaped envelope in a radial direction to provide electrical insulation between the ends of each turn so that the turn is not short circuited. Due to the insulation gap, the envelope forms an inductor coil with at least one turn and the ends of each turn are electrically insulated from each other by means of the insulation gap. The toroidal envelope thus provides the inductance in the LC resonator, and it can be composed of one, two or more inductor turns connected in series.

According to an embodiment of the invention, the insulation gap is filled with an insulating material to provide electrical isolation between the ends of the inductor unit and to provide mechanical stability.

According to an embodiment of the invention, the inductor unit comprises a plurality of inductor turns, connected in series to form an inductor winding. This is, for example, achieved by dividing the envelope into a plurality of portions extending from one side of the insolation gap to the other side of the insulation gap, and adding suitable wire connections between the portions on the inside of the envelope. Each portion of the envelope then forms one inductor turn of the complete inductor winding, and the turns are electrically insulated from each other by insulation gaps. More than one turn leads to higher inductor voltage, and accordingly lower capacitance values are required. The choice of the number of turns is an optimization question, depending on the properties of the capacitors available such as energy density, voltage rating, losses, and price.

The envelope, and accordingly the conductor, is made of an electrically conducting material, such as aluminium or copper. The conducting material serves two purposes. Firstly, the conducting material forms one or more turns of the inductor in the LC-resonator circuit. Secondly, the conducting material shields the capacitor unit both electrically and magnetically, and thus protects the capacitors both from the external high voltage stresses and from the strong magnetic fields outside the toroid which are generated by the resonator itself.

According to an embodiment of the invention, the envelope is made of copper. Copper is both a good electrical and a good thermal conductor. The toroidal shape of the envelope displays a relatively large surface, and since copper has high thermal conductivity, the envelope optimally dissipates heat generated internally by the capacitors and connection wires. This embodiment thus achieves an efficient cooling of the device.

According to an embodiment of the invention, the envelope has an axis of symmetry and the envelope is divided cross the axis of symmetry into first and second envelope halves, each of the first and second envelope halves is designed to form one turn of the inductor, in the following called an inductor turn. The inductor turns are connected in series. In this embodiment, the envelope is composed of two sections, i.e. upper and lower halves. By dividing the envelope into two halves, it becomes easy to insert the capacitor unit inside the envelope. Each of the envelope halves form one inductor turn, and the inductor turns are connected in series. The envelope halves are symmetrical. The envelope halves are coaxially arranged with respect to the axis of symmetry of the toroidal-shaped envelope.

According to an embodiment of the invention, the power transfer device comprises insulating material arranged between the first and second envelope halves to provide electrical isolation between the envelope halves and enhance mechanical stability. The envelope halves are arranged at a distance from each other to allow the electrical insulating material to be disposed between the envelope halves. Each of the envelope halves has inner and outer circular edges, and the insulating material is arranged between edges.

According to an embodiment of the invention, the first envelope half has a first insulation gap extending radially from an inner periphery to an outer periphery of the first envelope half, and the second envelope half has a second insulation gap extending radially from an inner periphery to an outer periphery of the second envelope half, and the power transfer device comprises at least one wire connected between the first and second envelope halves. By that, each of the envelope halves forms one turn of the inductor, and the two inductor turns are connected in series.

According to an embodiment of the invention, the power transfer device comprises a plurality of first wires electrically connected between the first and second envelope halves, each of the first wires has one end connected to the first envelope half at a first connection point and the opposite end connected to the second envelope half at a second connection point, and the first connection points are distributed along the first insulation gap and the second connection points are distributed along the second insulation gap. The term "connection point" means the point of connection between the wire and the surface of the envelope. This embodiment leads to a homogenous current distribution on the envelope surface. Suitably, the connection points are evenly distributed along the gap edge, i.e. the distances between neighboring connection points are about the same.

The first connection points are disposed in a first area in the vicinity of the first insulation gap, and the second connection points are disposed in a second area in the vicinity of the second insulation gap. Thus, the envelope halves are connected in series. The first and second areas in the vicinity to the insulation gap are, for example, disposed less than about 20 mm, and preferably less than 10 mm from the insulation gaps, in order to reduce excess losses due to shielding currents in the envelope.

According to an embodiment of the invention, the capacitor unit comprises a plurality of capacitors connected in parallel, and the capacitors are connected in series with the envelope. By having more than one capacitor connected in parallel, and connected in series to the envelope, more equal current distribution is achieved. Suitably, each of the capacitors has the same capacitance. A group of capacitors may form an array internally interconnected between them in parallel by their connections with the envelope, and connected in series with the envelope.

According to an embodiment of the invention, the capacitor unit comprises at least 5, and preferably at least 10 capacitors connected in parallel. Suitably, the capacitor unit comprises between 10 and 20 capacitors connected in parallel. The large number of capacitors causes a large number of connection points between the capacitors and the envelope, thereby providing an even current distribution in the envelope, and accordingly minimum losses in the conducting material of the envelope.

According to an embodiment of the invention, the power transfer device comprises a plurality of second wires connected between the capacitors and the first envelope half, each of the second wires having one end connected to the first envelope half at a third connection point, and the third connection points are distributed along the first insulation gap. This enables homogenous current distribution and accordingly reduces losses. The third connection points are disposed in a third area in the vicinity of the first insulation gap.

According to an embodiment of the invention, the power transfer device comprises a plurality of third wires connected between the capacitors and the second envelope half, and each of the third wires has one end connected to the second envelope half at a fourth connection point, and the fourth connection points are distributed along the second insulation gap. This enables homogenous current distribution and accordingly reduces losses. The fourth connection points are disposed in a fourth area in the vicinity of the second insulation gap. The third and fourth areas in the vicinity to the insulation gaps are, for example, disposed less than 20 mm, and preferably less than 10 mm from the insulation gaps.

According to an embodiment of the invention, the first area is disposed on one side of the first insulation gap and the third area is disposed on an opposite side of the first insulation gap, and the second area is disposed on one side of the second insulation gap and the fourth area is disposed on an opposite side of the second insulation gap.

According to an embodiment of the invention, the first and second wires are twisted pairwise around each other. This embodiment achieves an even current distribution among the first wires. Using twisted pairs of wires connecting the two envelope halves leads to a mutual inductance distribution which favors a more homogeneous current distribution among these wires. As a consequence, the current distribution entering and leaving the envelope at its edges becomes more homogeneous and thus reduces losses in the envelope as well as in the connecting wires.

According to an embodiment of the invention, the system comprises a plurality of the power transfer devices arranged coaxially, preferably in an equidistant manner, such that they transmit power in stages. The power transfer devices comprises a sending device, a receiving device, and optionally a plurality of intermediate transfer devices. Preferably, the devices are of identical or similar design. The system can be scaled and built up as a multistage system achieving the necessary distance. In this way, distances of one to several meters can be reached. The system comprises a plurality of LC resonators with toroidal shape arranged such that they transmit power in stages from the ground to the high potential level. The toroidal shape of the devices guarantee smooth electric field distribution around the wireless power system implying minimal electrical stresses. One of the power transfer devices can be connected to a high frequency converter that powers the system, and another of the power transfer devices can be connected to a load, or rectifier with subsequent load, at high potential. The system can bring electric power from ground to a specified height at high potential, either in an open space or through the interior of an insulator, which may be filled with a gas with higher dielectric strength, e.g. SF6. In this way, distances of one to several meters can be reached. The system is able to wirelessly power important devices, such as breakers, sensors, and energy storages, located at high potential. Each toroid can be sealed and coated, for example, with epoxy, ensuring a long duration system without wear and tear, thus minimizing maintenance.

The power transfer device produces a magnetic field flowing through the middle hole of the toroid and back through the outside space which is used to transfer power to a second, similar device. The power transfer device is an LC resonating circuit, where the toroidal conductor structure is its inductor part. A power transfer device can be excited for instance by direct connection to a power supply or by placing it in the magnetic field of a driving coil at resonance frequency. A resonant current through the LC circuit is then induced in the power transfer device. Because of the LC resonance, the device produces a strong magnetic field which can be used to induce a resonant current in another power transfer device placed at some distance from the first device.

According to an embodiment of the invention, the system comprises a power supply unit configured to supply the LC resonant circuit with AC power with a frequency between 10 kHz and 100 kHz. Depending on its design, the system is able to work at some specific frequency in the range of about 10 kHz to 100 kHz. This system is able to work with frequencies used in commercial devices e.g. 20 kHz. Thus, the system is cost effective since complete solutions for the power source as well standard capacitors available on the market can be used.

According to an embodiment of the invention, the thickness of a wall of the envelope is between 0.5 and 1.5 mm. The wall of the envelope should be thicker than 0.5 mm to provide sufficient mechanical stability. From the point of view of conductor losses, the wall of the envelope need not be thicker than the magnetic skin depth of the chosen conductor material at the chosen frequency.

Another object of the present invention is to provide a high voltage circuit breaker able to transfer power from a power supply source located in a ground region to an interrupter unit located in a high voltage region.

This object is achieved by a high voltage circuit breaker comprising a system according to the invention arranged for wireless power transfer between the ground region and the high voltage region.

According to an embodiment of the invention, the high voltage circuit breaker comprises at least one interrupter unit located in the high voltage region and including a movable contact arranged movable between an opened and closed position, an operating mechanism arranged to move the movable contact between the opened and closed position, wherein the operating mechanism is located in the high voltage region, and the system according to the invention is arranged for wireless power transfer between the power supply source and the operating mechanism.

This system can also be embedded inside a supporting insulator containing an insulating gas, e.g. SF6.

The system according to the invention can suitably be used for wireless power transfer between a low electric potential, for example ground, and a high electric potential, i.e. a potential of from 1 kV up to several 100 kV. The system according to the invention can suitably be used to wirelessly transfer power from a low potential to equipment located at a high potential.

BRIEF DESCRIPTION OF THE DRAWINGS

The invention will now be explained more closely by the description of different embodiments of the invention and with reference to the appended figures.

DETAILED DESCRIPTION

Figure 1:
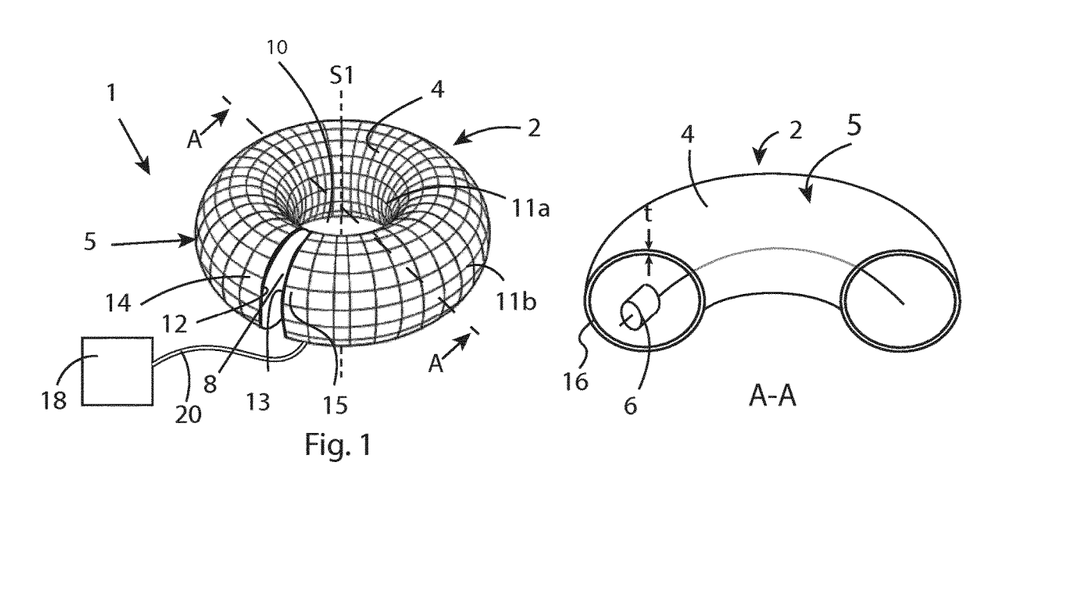
FIG. 1 shows a system for wireless power transfer according to an embodiment of the invention including a power transfer device shown in a perspective view and in a radial cross section.

FIG. 1 shows a sending part of a system 1 for wireless power transfer according to an embodiment of the invention. In this embodiment, the sending part comprises one power transfer device 2. The left side of FIG. 1 shows the power transfer device 2 in a perspective view, and the right side of FIG. 1 shows the power transfer device 2 in a cross-section A-A. The power transfer device 2 comprises an inductor unit 4 designed as an envelope 5 with a toroidal shape having an axis of symmetry S1. The envelope 5 has a surface of revolution with a through-hole 10 in the middle, like a doughnut, or like a high-voltage shielding ring. The axis of symmetry S1 passes through the through-hole 10 and does not intersect the surface of the envelope 5. The oscillating magnetic field generated by the power transfer device passes through this hole 10 and is roughly oriented along the axis of symmetry S1. The inductor unit 4 may include one or more turns of the conductor, in the following denoted inductor turns. The power transfer device 2 further comprises a capacitor unit 6 including one or more capacitors disposed inside the envelope 5 4. The capacitors can, for example, be of a standard metallized polypropylene foil type. The capacitor unit 6 and an inductor unit 4 are connected in series to form an LC resonant circuit.

The envelope 5 has the shape of a toroid with a smooth surface to minimize electric stresses in a high voltage environment. The envelope 5 has a central through-hole 10, a circular inner periphery 11a, and a circular outer periphery 11b. Preferably, the envelope 5 has a circular cross-section and accordingly is shaped as a torus, as show in FIG. 1. The envelope 5 is provided an insulation gap 8 extending radially from the inner periphery 11a to the outer periphery 11b of the envelope so that an inductor unit 4 including one or more inductor turns is formed. The inductor unit 4 extends from one side 12 of the insolation gap 8 to an opposite side 13 of the insulation gap. The insulation gap 8 radially cuts the envelope 5 so that opposite ends 14, 15 of the inductor unit are electrically insulated from each other. The inductor unit 4 is circular and extends around the axis of symmetry S1 from one side 12 to the opposite side 14 of the insulation gap 8. The inductor unit 4 is curved and has two ends 14, 15 arranged on opposite sides of the insulation gap 8. The inductor unit 4 may include one or more inductor turns, forming a coil. Thus, the envelope forms a coil with at least one turn, which generates the oscillating magnetic field used for the wireless power transfer. The insulation gap 8 is, suitably between 1-5 mm, in order to provide electrical insulation between the ends 14, 15 of the inductor unit. The insulation gap 8 can be provided with an insulating material in order to seal the envelope.

The basic idea of the invention is to build an inductor unit out of a conducting material, for example, a copper plate, in the shape of a toroid surface, with a small number N of turns, for example between 1 and 10 turns, and place the capacitor unit 6 in the interior of the inductor unit. As a consequence, the entire power transfer device 2 has a smooth, conducting, toroidal outer surface. The device 2 is therefore ideally suited for placement in a strong outer electric field, since it leads to minimal field distortion, and thus presents minimal risk for causing corona discharges or even electrical breakdown.

The envelope 5 is, for example, made of a solid conducting material, such as a metal plate shaped into a toroid surface. The material of the envelope can, for example, be copper, silver, aluminum or any other good conductor, including e.g. carbon based nanostructures, which would need a special frame and dedicated contacts. Alternatively, it can be made of thin enameled wires in a Litz configuration, which minimizes losses at HF. The inductance of the inductor unit can be tailored to any specific requirements by choosing a solution with the appropriate number of turns.

The envelope 5 defines an inner space for housing the capacitor unit 6 and wires. The wall 16 of the envelope 5, and accordingly of the inductor unit 4, has suitably a uniform thickness t. The thickness t of the wall 16 of the envelope 5 is preferably thicker than 0.5 mm to provide sufficient mechanical stability. The thickness t of the wall of the envelope 5 is suitably between 0.5 and 1.5 mm. However, the thickness t need not be larger than the skin depth of the chosen frequency, since the losses would be the same for a thicker wall. For example, if the frequency of the current is 65 kHz, the thickness t need not be larger than 0.8 mm.

The system 1 further comprises a power supply unit 18 configured to supply the LC resonant circuit with AC power. The power supply unit 18 is electrically connected to the inductor unit 4 by means of a cable 20. Preferably, the power supply unit 18 is configured to supply power with a frequency between about 10 kHz and 100 kHz. The power supply unit may comprise a high frequency converter configured to convert the frequency from a conventional power source to a suitable frequency.

The inductor unit 4 may include one or more inductor turns. FIGS. 2-6 disclose examples of inductor units including different numbers of inductor turns. By dividing the envelope into a plurality of portions extending from one side of the insolation gap 8 to the other side of the insulation gap 8, it is possible to provide two or more inductor turns. Alternatively, the toroid-shaped inductor unit can be formed out of many turns of conducting wire. Preferably litz wire should be used to minimize eddy-current losses. In this case, the radial insulation gap 8 is not needed.

Figure 2:
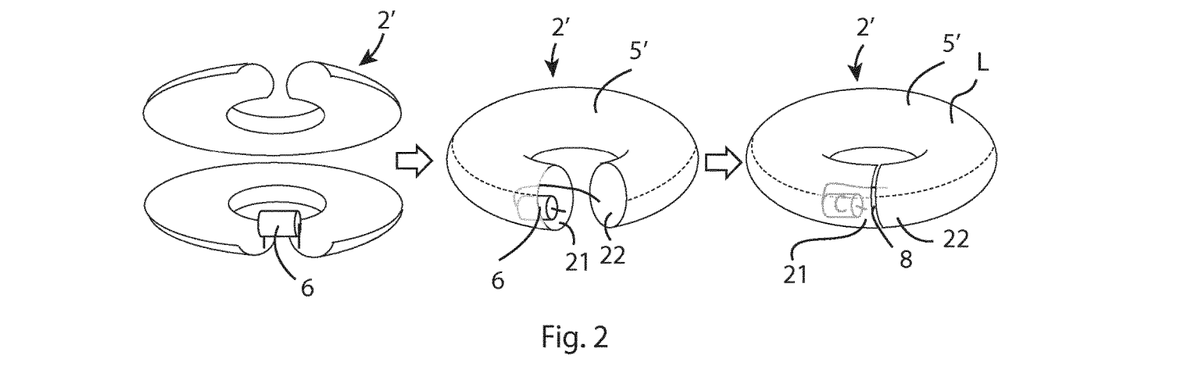
FIG. 2 shows an example of a power transfer device including a capacitor and an inductor unit with one inductor turn.

FIG. 2 shows a first example of a power transfer device 2' that comprises an inductor unit designed as an envelope 5' with a toroidal shape forming an inductor L with one inductor turn. For one inductor L, it is necessary to open the envelope 5', as shown in the left side of FIG. 2, place the capacitor unit 6 inside the envelope, and then close the envelope and join it, for example by welding, in a horizontal direction but leaving a narrow insulation gap 8 in a vertical direction, as shown in the left side of FIG. 2. The inductor L extends around the axis of symmetry of the envelope and has a first end 21 ending at one side of the insulation gap 8, and a second end 22 ending at the opposite side of the insulation gap 8. The capacitor unit 6 is connected between the first end 21 of the inductor L and the second end 22 of the inductor L.

Figure 3:
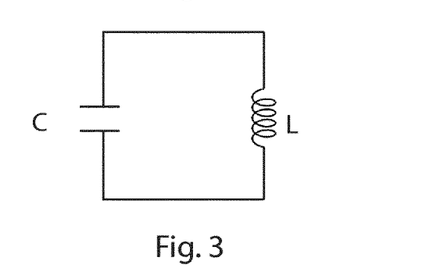
FIG. 3 shows an electric scheme of an LC resonator circuit corresponding to the device shown in FIG. 2.

FIG. 3 shows an electric scheme of an LC resonator circuit corresponding to the device 2' shown in FIG. 2. The circuit includes an inductor L and a capacitor C connected in series. The circuit may be connected to a power supply to give a current through the circuit or it may be powered by providing a magnetic field through the coil of the inductor unit, which will induce a current in the circuit. The function of the LC resonant circuit is to produce a strong oscillating current which in turn creates a strong oscillating magnetic field.

Figure 4:
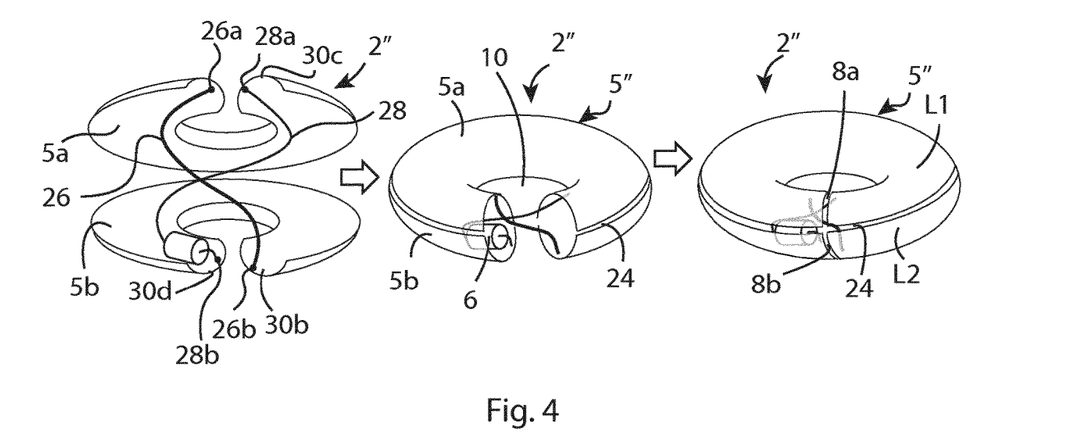
FIG. 4 shows an example of a power transfer device including two inductor turns.
Figure 5:
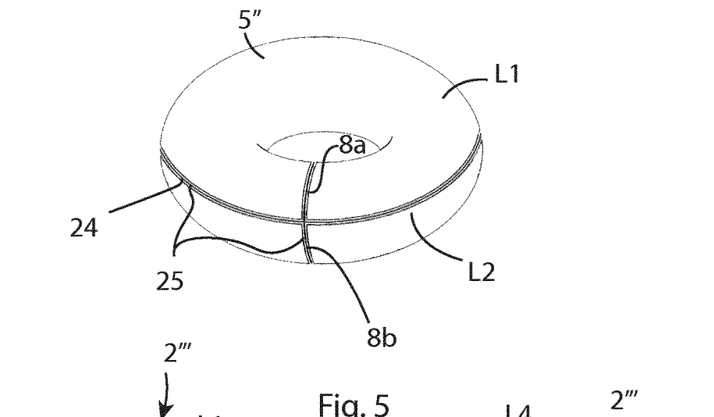
FIG. 5 shows the power transfer device shown in FIG. 4 with insulating material provided in insulation gaps.

FIGS. 4 and 5 show a second example of a power transfer device 2" including two inductor turns L1 and L2. The envelope 5" is divided perpendicular to the axis of symmetry C1 into first and second envelope halves 5a-b. The envelope halves 5a-b are symmetrical and coaxially arranged with respect to the axis of symmetry C1 of the toroidal shaped envelop. Each of the first and second envelope halves 5a-b is designed to form one inductor turn L1, L2 of the inductor winding. The inductor turns L1, L2 are connected in series. Thus, the inductor unit has two inductor turns connected in series in this embodiment. The envelope 5" has an insulating gap divided into a first insulating gap 8a and a second insulating gap 8b in order to separate the ends of the turns L1, L2 and to provide electrical insulation between these ends. The first insulation gap 8a extends radially from the central through-hole 10 to an outer periphery of the first envelope half 5a, and the second insulation gap 8b extends from the central through-hole 10 to the outer periphery of the second envelope half 5b. The envelope halves 5a-b are arranged at a distance from each other so that a second insulating gap 24 is formed between the envelope halves 5a-b to provide electrical insulating between the envelope halves in a horizontal plane. The second insulating gap 24 extends in a circumferential direction around the envelope and is arranged perpendicular to the first and second insulation gaps 8a-b. Suitably, insulating material is disposed in the second insulating gap 24 between the envelope halves 5a-b in order to mechanically stabilize and seal the envelope halves. Suitably, insulating material 25 is disposed in the first and second insulating gaps 8a-b as well as in the second insulating gap 24 in order to seal the envelope and form a uniform envelope 5", as shown in FIG. 5.

The power transfer device 2" comprises at least one first wire 26 electrically connected between the first and second envelope halves 5a-b so that the envelope halves 5a-b are connected in series. The wire 26 has a first connection point 26a in a first area 30a in the vicinity of the first insulation gap 8a, and a second connection point 26b in a second area 30b in the vicinity of the second insulation gap 8b. The capacitor unit 6 is connected between the first and second envelope halves 5a-b so that the capacitor unit 6 is connected in series with the first and second inductor turns L1, L2. The power transfer device 2" comprises at least one second wire 28 electrically connected between the capacitor unit 6 and the first envelope half 5a. The second wire 28 has a third connection point 28a in a third area 30c in the vicinity of the first insulation gap 8a. The capacitor unit 6 is also connected in a fourth connection point 28b to a fourth area 30d in the vicinity of the second insulation gap 8b. The first area 30a and the second area 30b are disposed on opposite sides of the first insulation gap 8a of the first envelope half 5a, and the third area 30c and the fourth area 30d are disposed on opposite sides of the second insulation gap 8b of the second envelope half 5b. The distance between the insulation gaps 8a-b and the connection points 26a-b and 28a-b is preferably less than 20 mm, and more preferably less than 10 mm.

Figure 6:
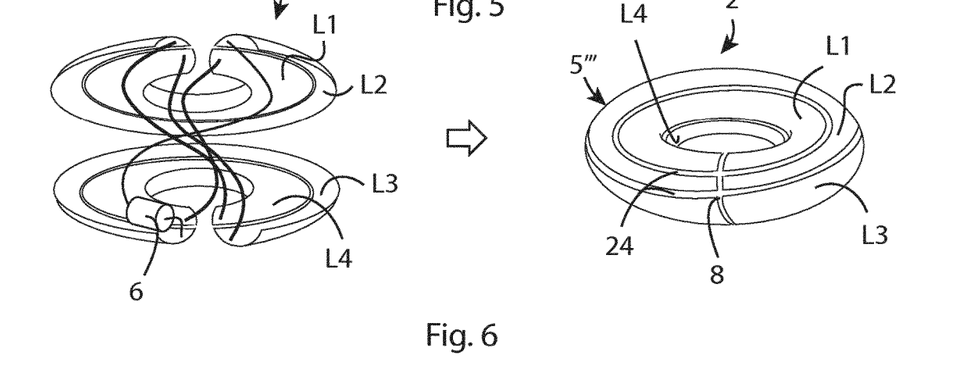
FIG. 6 shows an example of a power transfer device including four inductor turns.

FIG. 6 shows a third example of a power transfer device 2''' including four inductor turns L1-L4. In this embodiment, the envelope 5''' is divided into four portions extending from one side of the insulation gap 8 to the other side of the insulation gap 8 so that each portion forms one inductor turn L1-L4. The portions are divided by two second insulation gaps 24 extending in a circumferential direction and perpendicular to the first insulation gap 8. Suitably, insulating material is disposed in the first insulating gap 8 as well as in the second insulating gaps 24 in order to mechanically stabilize and seal the portions and form a uniform envelope 5'''. Each of the inductor turns L1-L4 is circular and extends around the axis of symmetry S1 from one side of the insolation gap 8 to an opposite side of the insulation gap. The insulation gap 8 radially cuts the envelope 5''' so that the opposite ends of the inductors L1-L4 are electrically insulated from each other. The inductor turns L1-L4 are connected in series. Thus, the inductor coil has four windings. When doing the connections between the sections, the orientation of wires should preferably be made such that the currents in the sections run all in the same directions. To avoid too large differences in path lengths, and therefore resistivity, between inner sections L1, L4 and outer sections L2, L3, in the multi-winding solution, a twisting is added to the wires.

Figure 7:
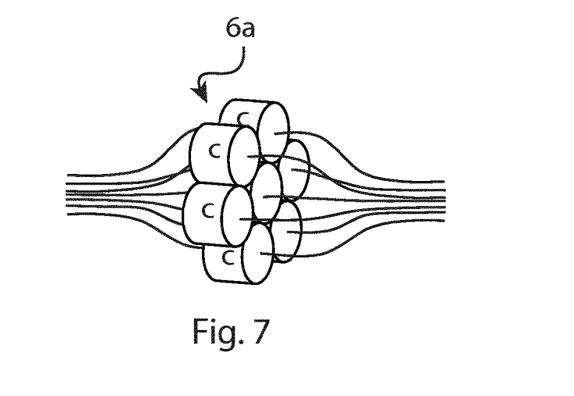
FIG. 7 shows an example of a capacitor unit including a plurality of capacitors.

FIG. 7 shows an example of a capacitor unit 6a including a plurality of capacitors C connected in parallel, more precisely each individually and separately connected to the same connection areas (marked 42 and 44 in FIG. 8) on the inside of the toroidal envelope. In this example, the capacitor unit 6a includes seven capacitors C. It is advantageous to have a large number of capacitors connected in parallel between areas 42 and 44 since a large number of connection points distributed in areas 42 and 44 provide an even current distribution in the envelope, and accordingly minimum losses in the conducting material of the envelope. Suitably, the capacitor unit 6a may comprise for instance between 10 and 20 capacitors connected in parallel. The capacitors are, for example, standard axial polypropylene foil capacitors. However, other types of low-loss AC capacitors can be used.

Figure 8:
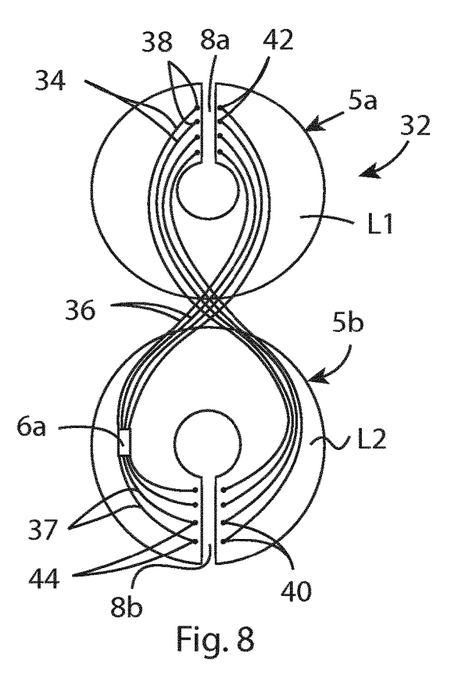
FIG. 8 shows an example of wiring of a power transfer device including two inductor turns and a capacitor unit including a plurality of capacitors.

FIG. 8 shows an example of a suitable wiring of a power transfer device 32 including two inductor turns L1, L2 connected in series and a capacitor unit 6a including a plurality of capacitors connected in parallel. The device comprises a large number of first wires 34 connected between the first and second inductor turns L1, L2. Each of the first wire 34 has a first connection point 38 in a first area in the vicinity of the first insulation gap 8a, and a second connection point 40 in a second area in the vicinity of the second insulation gap 8b. The first connection points 38 are distributed along the first insulation gap 8a, and the second connection points 40 are distributed along the second insulation gap 8b. Preferably, the first and second connection points 38, 40 are evenly distributed along the first and second insulation gap 8a-b. A large number of connection points 38, 40 between the inductors L1, L2 provide an even current distribution in the envelope, and accordingly minimum losses in the connecting wires as well as in the conducting material of the envelope.

The power transfer device 32 comprises a plurality of second wires 36 connected between the capacitors C of the capacitor unit 6a, and the first inductor turn L1. Each of the second wires 36 has a third connection point 42 in a third area in the vicinity of the first insulation gap 8a, and the third connection points 42 are distributed along the first insulation gap 8a. The power transfer device 32 comprises a plurality of third wires 37 connected between the capacitors C of the capacitor unit 6a, and the second inductor turn L2. Each of the third wires 37 has a fourth connection point 44 in a fourth area in the vicinity of the second insulation gap 8b, and the fourth connection points 44 are distributed along the second insulation gap 8b. Preferably, the fourth connection points 44 are evenly distributed along the second insulation gap 8b. With the term "in the vicinity of the insulation gap" is meant a distance preferably less than 20 mm from the insulation gap, and more preferably less than 10 mm.

The first and third areas are disposed on different sides of the first insulation gap 8a, and the second and fourth areas are disposed opposite sides of the second insulation gap 8b. The directions of the current in the first and second wires 34, 36 are opposite. Suitably, the first and second wires 34, 36 are twisted pairwise around each other in order to achieve an even current distribution among the first wires 34; the even current distribution among the second wires 36, or equivalently, the third wires 37, is guaranteed by the capacitors.

Figure 9:
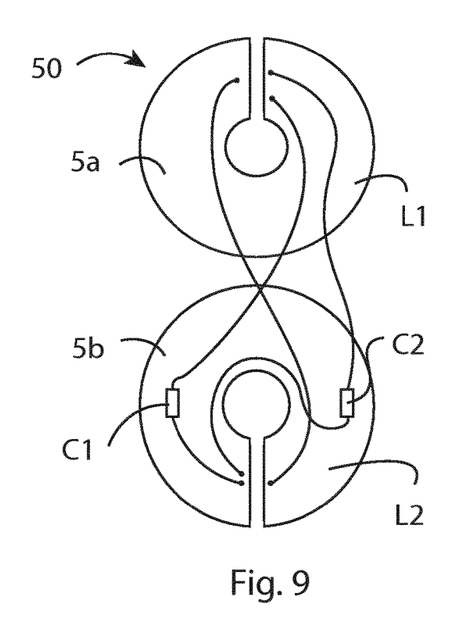
FIG. 9 shows an example of a power transfer device including two inductor turns and two capacitor units.
Figure 10:
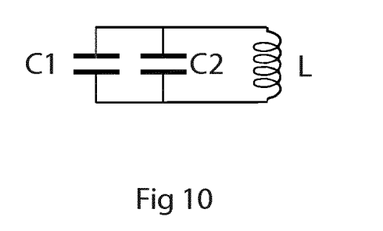
FIG. 10 shows an electric scheme of an LC resonator circuit corresponding to the device shown in FIG. 9.

FIG. 9 shows another example of a power transfer device 50 including two inductor turns L1 and L2 and two capacitor units C1, C2 which are located on opposite sides of the insulation gap 8. This can for instance be necessary due to the restricted space available for the capacitors inside the toroidal envelope and the need to keep the second and third connecting wires as short as possible. Each of the capacitor units C1, C2 may advantageously include a plurality of capacitors. For simplicity, only a few wires are shown in the figure. FIG. 10 shows an electric scheme of an LC resonator circuit corresponding to the power transfer device 50 shown in FIG. 9, having an inductor unit L with two inductor turns L1, L2.

Figure 11:
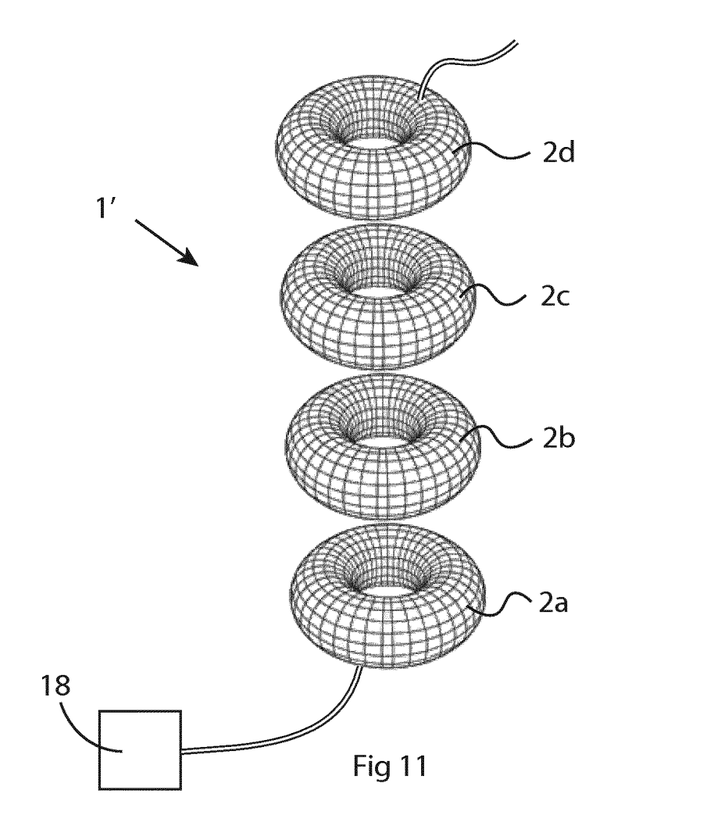
FIG. 11 shows a system for wireless power transfer according to an embodiment of the invention including a plurality of power transfer devices.

FIG. 11 shows a system 1' for wireless power transfer according to another embodiment of the invention, including a plurality of power transfer devices arranged coaxially and evenly spaced such that they transmit power in stages. In this embodiment, the system comprises four power transfer devices 2a-d. However, the number of power transfer devices can vary depending on the distance the power is to be transferred. The separation distance between power transfer devices 2a-d should be at most of the order of the diameter of the toroidal devices or less, in order to insure an acceptable transfer efficiency (the smaller the separation distance, the higher the efficiency). The lowest of the power transfer devices 2a is supplied with power from a power supply unit 18 including a high frequency converter. Suitably, the power supplied to the system 1' has a frequency between 10 kHz and 100 kHz in order to keep the losses in the power transfer within acceptable limits and at the same time allowing simple and cost effective solutions. The uppermost of the power transfer devices 2d is via a cable connected to a rectifier and/or a load.

In one example, the power transfer devices 2a-d of the system 1" comprises envelopes made of copper and having an external diameter of 150 mm. The wall thickness of the envelope is 1 mm. The frequency of the power to be transferred is ca. 60 kHz. The choice of wall thickness (1 mm) is based on the skin depth ($\delta$) range for copper at frequencies in the range 10-100 kHz which is 0.64-0.20 mm, respectively. In this example, the capacitor unit comprises 28 capacitors, each one of 3.3 µF. This system 1' is configured to transfer power through a SF6 interior environment of a supporting insulator for operating a live tank beaker (LTB) at 145 kV. A main requirement for this embodiment is that it should be able to transfer 100 Watts to a 1.4 m height from ground potential.

Figure 12:
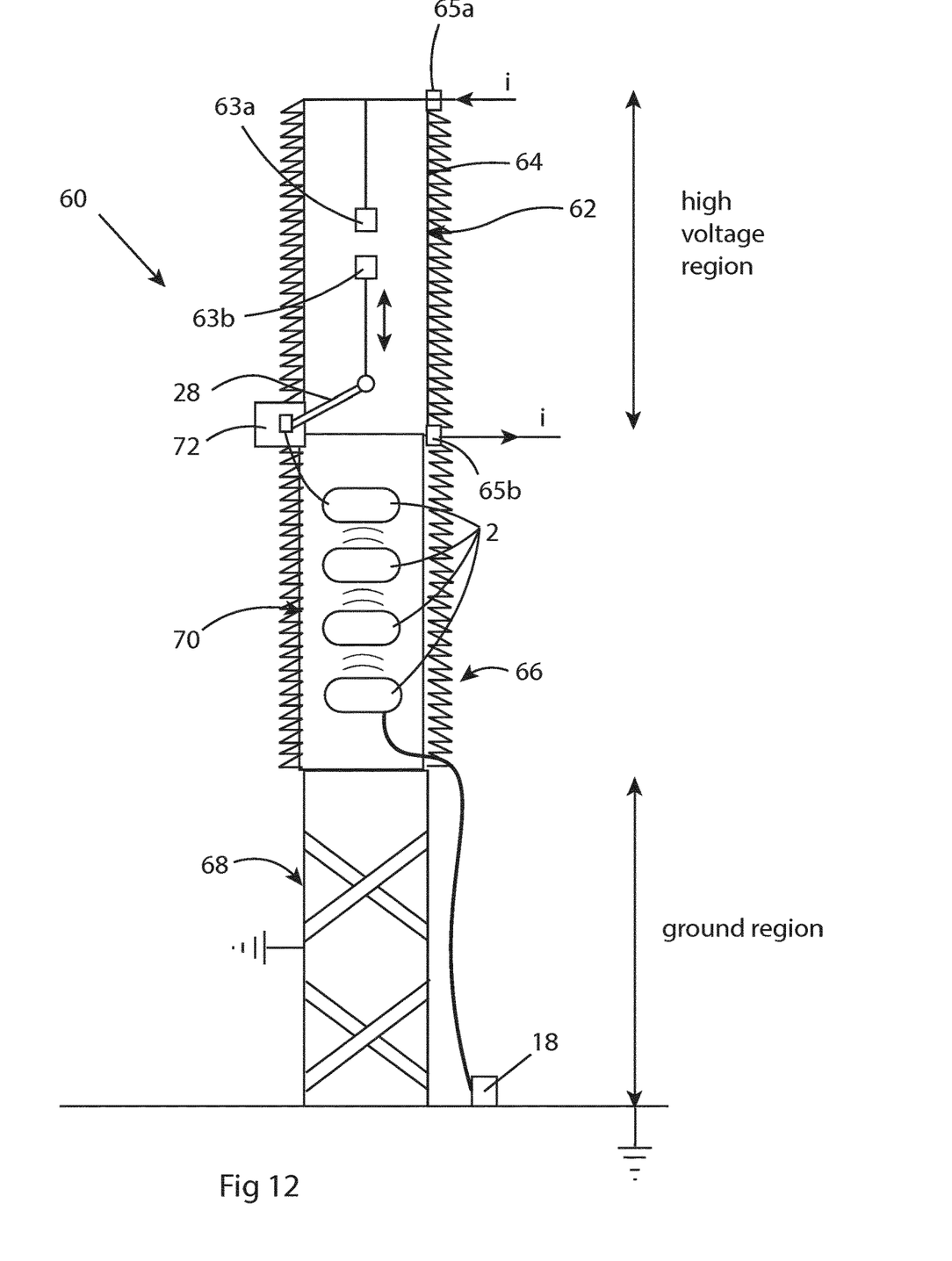
FIG. 12 shows an example of a high voltage circuit breaker including a system for wireless power transfer according to an embodiment of the invention.

FIG. 12 shows an example of a high voltage circuit breaker 60 including a system 1' for wireless power transfer according to an embodiment of the invention. A circuit breaker is an automatically operated electrical switch designed to protect an electrical circuit from damage due to an overcurrent caused by a fault. Its basic function is to interrupt current flow after a protective sensor has detected a fault. The circuit breaker 60 comprises an interrupter unit 62 including fixed contact 63a and a movable contact 63b arranged movable in relation to the fixed contact between an opened and a closed position. The interrupter unit 62 further comprises an insulating housing 64 enclosing the fixed and movable contacts 63a-b, and having an electrical input terminal 65a in one end, and an electrical output terminal 65b in the opposite end. The interrupter unit 62 is arranged in an upper high electrical potential region, i.e. at a potential above 1 kV, located at some distance from a lower ground region. The circuit breaker 60 further comprises an operating mechanism 72 arranged to move the movable contact 63b between the opened and closed position. The operating mechanism 72 is located in the high potential region. The system 1' is arranged for wireless power transfer between the power supply source 18 and the operating mechanism 72.

The circuit breaker 60 further comprises a support frame 66 for supporting the interrupter unit 62 and to keep the interrupter unit at a safe distance from ground. The support frame 66 includes a base part 68 arranged in the ground region, i.e. a region at ground potential, and a supporting insulator 70 extending between the base part 68 and the interrupter unit 62. The supporting insulator is filled with an insulating medium, for example, SF6. The supporting insulator 70 provides electrical insulation between the base part 68 at ground potential and the interrupter unit 62 at high potential.

The system 1' for wireless power transfer comprises a series of consecutive power transfer devices 2 located above each other. In this embodiment the number of power transfer devices 2 is four. However, the number of power transfer devices 2 may vary in dependence on the application. The lowest of the power transfer devices 2 receives power from a power supply unit 18 and wirelessly transmits power to the next power transfer device 2. The upper power transfer device 2 wirelessly receives power from the previous power transfer device and is electrically connected to the operating mechanism 72 via a cable to supply the operating mechanism with power. The supporting insulator 70 is hollow and the system 1' is located inside the hollow supporting insulator 70. The power transfer devices 2 are located one after another inside the hollow supporting insulator. In an alternative embodiment, the system 1' can be located partly or wholly outside the supporting insulator 70.

Figure 13:
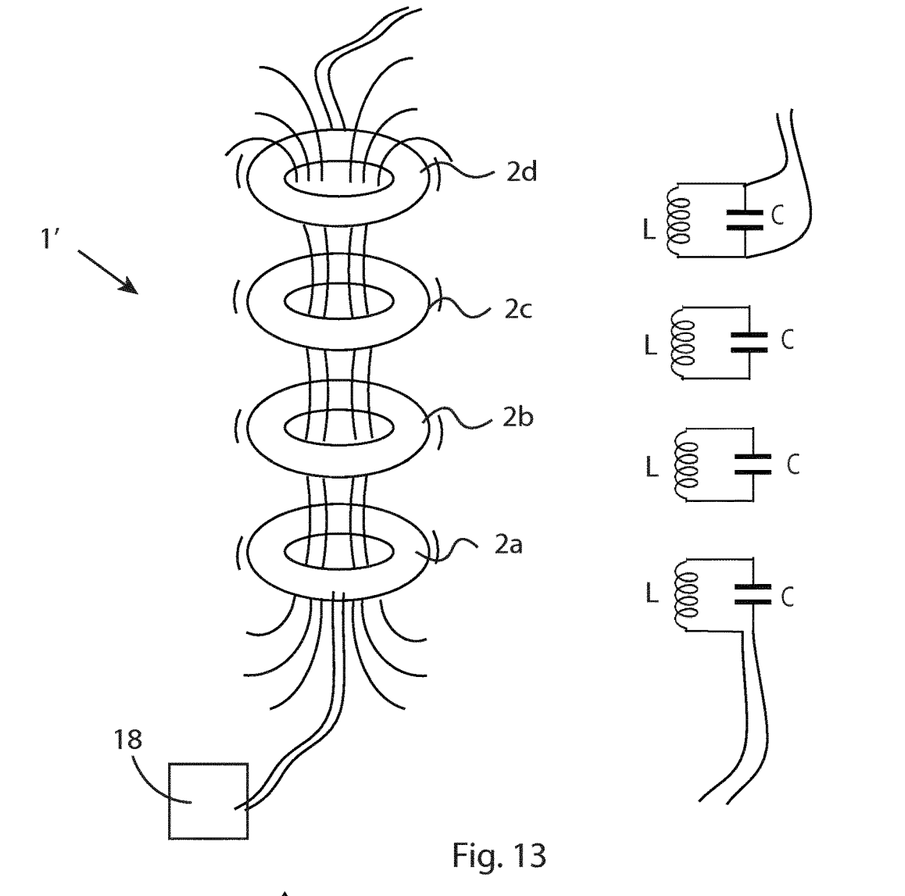
FIG. 13 shows a system for wireless power transfer according to an embodiment of the invention including a plurality of power transfer devices.

FIG. 13 shows a system for wireless power transfer according to an embodiment of the invention including a plurality of power transfer devices as also shown in FIG. 11. In this figure, the magnetic field is indicated. Also, on the right side in the figure, circuit diagrams of the toroids are illustrated. The magnetic field is a direct consequence of the design of the power transfer devices. The lowest of the power transfer devices 2a is supplied with power from a power supply unit 18 including a high frequency converter, the same as shown in FIG. 11. The power supply unit gives a current to the lowest power transfer device 2a which creates a magnetic field through the toroidal shape as shown in the figure. Thus, the power supply unit 18 feeds a current to the lowest power transfer device which creates a magnetic field through the center of it. Another power transfer device 2b is placed above the lowest one and at a distance from the lowest one. The second power transfer device 2b is affected by the magnetic field of the first 2a such that a current is induced, creating its own magnetic field. Induced current and resulting magnetic field are strong since the power transfer devices are LC resonant circuits. In the figure, a third 2c and a fourth 2d power transfer device are placed above the second. The third 2c has the same function as the second 2b and the fourth 2d is via a cable connected to a rectifier and/or a load. In other words, the fourth power transfer device has a cable connected for the power output of the system 1". It should be noted that the number of power transfer devices in the system 1" is only an example, the number of power transfer devices used is up to the system designers when using them. According to some aspects, there are at least two power transfer devices, one placed above the other. The connections from power supply to first power transfer device or from last power transfer device to load can each be realized in different ways, either by direct connection in one of the two ways indicated in FIG. 13 or by inductive coupling to a separate driving or pickup coil. The essential point is that power is injected into the first resonator and tapped from the last. Note that in all cases capacitor and inductor units are series connected in the sense that the dominating current flowing in the LC resonant circuits is the same in both of them.

Figure 14:
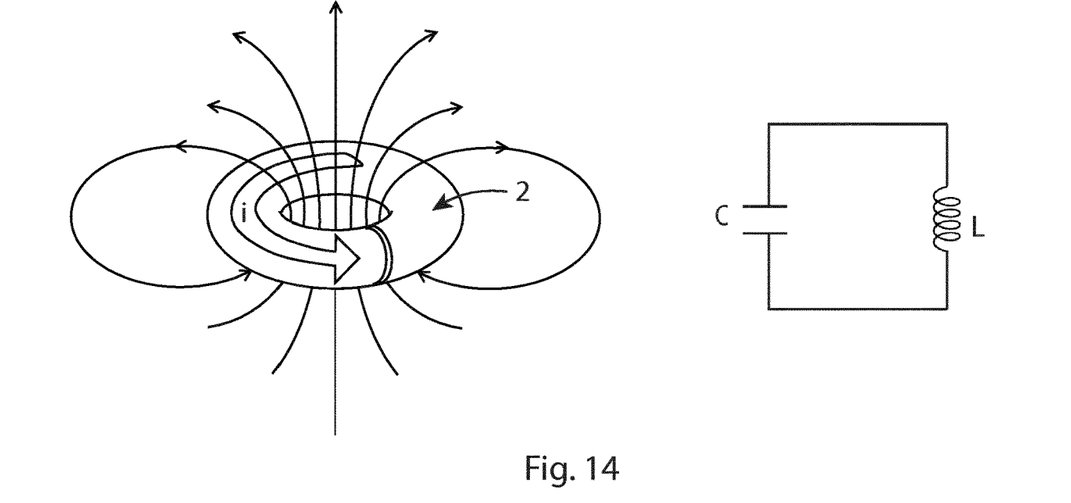
FIG. 14 shows an example of a power transfer device including a capacitor and an inductor unit where a current i and the magnetic field are indicated.

FIG. 14 shows an example of a power transfer device including a capacitor and an inductor unit where a current i and the magnetic field are indicated. As previously discussed, the current i is driven by the power supply 18 in the case that the power transfer device is the lowest device 2a shown in FIG. 13. In the other cases, the current will be induced by the magnetic field from the power transfer device below. The direction of the current and the magnetic field are dictated by laws of physics; a current in the anti-clockwise direction as shown, will give a magnetic field according to the arrows in the figures. To the right in FIG. 14, a circuit diagram of the toroid is illustrated. As previously explained, the inductor unit L is the toroidal shaped envelope and the capacitor unit C is located inside the envelope.

The present invention is not limited to the embodiments disclosed but may be varied and modified within the scope of the following claims. For example, the numbers of inductor turns and of capacitors, as well as their types, composing materials, and precise geometrical arrangement, can be varied. The size and number of the power transfer devices can be varied depending on the application.

In another embodiment of the invention, the toroidal envelope forming the inductor unit is not only divided into several portions, but may also include several layers which are electrically insulated from each other, and thus can form individual inductor turns. Such a design can be advantageous for instance in cases where the envelope is constructed out of litz wire instead of massive conductor material.

In yet another embodiment of the invention, the toroidal envelope forming the inductor unit is formed by many turns of some wire, preferably litz wire.

The invention claimed is:

1. A system for wireless power transfer in a high voltage environment comprising a power transfer device including a capacitor unit and an inductor unit connected in series to form an LC resonant circuit, wherein the inductor unit is designed to form an envelope with a toroidal shape, the envelope has an insulation gap extending radially from an inner periphery to an outer periphery of the envelope so that an inductor coil with at least one turn extending from one side of the insulation gap to the other side of the insulation gap is formed and ends of each turn are electrically insulated from each other by means of the insulation gap, and the capacitor unit is disposed inside said envelope such that the envelope wraps the capacitor unit and wires between the capacitor unit and the inductor unit.

2. The system according to claim 1, wherein said envelope is divided into a plurality of portions extending from one side of the insulation gap to the other side of the insulation gap, and each portion is designed to form an inductor turn.

3. The system according to claim 1, wherein said envelope has an axis of symmetry and the envelope is divided cross the axis of symmetry into a first envelope half and a second envelope half, each of the first envelope half and the second envelope half is designed to form at least one inductor turn, and the inductor turns are connected in series.

4. The system according to claim 3, wherein the first envelope half has a first insulation gap extending radially from an inner periphery to an outer periphery of the first envelope half, and the second envelope half has a second insulation gap extending radially from an inner periphery to an outer periphery of the second envelope half, and the power transfer device includes at least one wire connected between the first envelope half and the second envelope half.

5. The system according to claim 4, wherein said at least one wire includes a plurality of first wires having one end connected to the first envelope half at a first connection point and the opposite end connected to the second envelope half at a second connection point, and said first connection points are distributed along the first insulation gap and said second connection points are distributed along the second insulation gap.

6. The system according to claim 5, wherein the power transfer device includes a plurality of second wires connected between the capacitor unit and the first envelope half, each of the second wires having one end connected to the first envelope half at a third connection point, and the third connection points are distributed along the first insulation gap.

7. The system according to claim 6, wherein the first wires and the second wires are pairwise twisted around each other.

8. The system according to claim 1, wherein said capacitor unit includes a plurality of capacitors connected in parallel.

9. The system according to claim 8, wherein said capacitor unit includes at least 5, and preferably at least 10 capacitors.

10. The system according to claim 1, wherein said envelope is made of copper.

11. The system according to claim 1, wherein the system includes a plurality of said power transfer device arranged coaxially and such that they transmit power in stages.

12. The system according to claim 11 wherein the plurality of power transfer device are located above each other.

13. The system according to claim 1, wherein the system includes a power supply unit configured to supply the LC resonant circuit with AC power with a frequency between 10 kHz and 100 kHz.

14. A high voltage circuit breaker comprising an interrupter unit located in a high potential region at high electrical potential, and a power supply source located at ground potential wherein the high voltage circuit breaker includes a system according to claim 1 arranged for wireless power transfer between the ground potential and the high potential region.

15. The high voltage circuit breaker of claim 14, further comprising:
an interrupter unit having a fixed contact and a moveable contact arranged movable in relation to the fixed contact between an opened position and a closed position; and
an operating mechanism configured to move the movable contact between the opened position and closed position, wherein the operating mechanism is arranged for wireless power transfer from the system according to claim 1.

16. The high voltage circuit breaker of claim 15 further comprising a support frame supporting the interrupter unit.

17. A use of the system according to claim 1 for wireless power transfer between a low electrical potential and a high electrical potential.

18. The system according to claim 1, wherein the toroidal shape has a smooth surface and no sharp edges, so that excessive electric field gradients are minimized.

19. The system according to claim 1, further comprising insulating material disposed in the insulation gap.

20. The system according to claim 1 wherein a thickness of the envelope is based on a skin depth range for copper at frequencies in the range of 10-100 KHz.

* * * * *